(12) United States Patent
Koike (10) Patent No.: US 8,780,218 B2
(45) Date of Patent: Jul. 15, 2014

(54) COMMUNICATION DEVICE AND METHOD OF CONTROLLING SAME

(71) Applicant: Canon Kabushiki Kaisha, Tokyo (JP)

(72) Inventor: Kohtaro Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/754,087

(22) Filed: Jan. 30, 2013

(65) Prior Publication Data

US 2013/0201353 A1 Aug. 8, 2013

(30) Foreign Application Priority Data

Feb. 6, 2012 (JP) ................................. 2012-023508

(51) Int. Cl.
*H04N 5/232* (2006.01)
(52) U.S. Cl.
USPC ................ 348/211.3; 348/211.11; 348/211.2
(58) Field of Classification Search
None
See application file for complete search history.

(56) References Cited

U.S. PATENT DOCUMENTS

| 7,177,910 | B1 * | 2/2007 | Bell | 709/208 |
| 7,849,150 | B2 * | 12/2010 | Loeebbert et al. | 709/208 |
| 8,472,312 | B1 * | 6/2013 | Yang et al. | 370/219 |
| 2009/0300133 | A1 * | 12/2009 | Basson | 709/209 |

FOREIGN PATENT DOCUMENTS

| JP | 2006-108730 | 4/2006 |
| JP | 2011-095473 | 5/2011 |

* cited by examiner

*Primary Examiner* — Aung S Moe
*Assistant Examiner* — Euel Cowan
(74) *Attorney, Agent, or Firm* — Cowan, Liebowitz & Latman, P.C.

(57) ABSTRACT

The invention reduces the possibility that a state contrary to user volition will arise in a system that permits multiple masters. To accomplish this, a communication device includes a setting unit configured to set the communication device to be a master or to be a slave, a decision unit configured to decide whether to permit a plurality of masters to exist within the image sensing network, and a notifying unit configured to transmit a notification to change another master within the image sensing network to a slave. The notifying unit transmits the notification, if a plurality of masters have not been permitted to exist within the image sensing network by the decision unit and the communication device has been changed from a slave to a master by the setting unit.

10 Claims, 9 Drawing Sheets

COMMUNICATION DEVICE AND METHOD OF CONTROLLING SAME

BACKGROUND OF THE INVENTION

1. Field of the Invention

The present invention relates to an image sensing system constructed within a network that includes an image sensing device or an accessory of an image sensing device.

2. Description of the Related Art

In a multiple-flash device system in which multiple flash devices are fired synchronously or a system in which multiple image sensing devices have their shutters released in synchronized fashion, each device functions as a master or a slave. The master is referred to as the side that controls the slave and, conversely, the slave is referred to as the side controlled from the master. When such a system is constructed, there are instances where a slave is controlled by one or a plurality of masters. Further, there are also cases where one wishes to change a certain slave to a master. Accordingly, the setting of masters and slaves is required to be carried out in a planned and systematic manner.

Relevant examples of the prior art are Japanese Patent Laid-Open No. 2006-108730 and Japanese Patent Laid-Open No. 2011-95473.

In Japanese Patent Laid-Open No. 2006-108730, it is disclosed that when any one of multiple cameras has its shutter released, this camera becomes the master camera and the remaining cameras are set as slave cameras and their shutters are released at least in synchronization. In addition, the images captured by the slave cameras are transferred to the master camera, and these images and the image captured by the master camera are displayed. However, a problem is that Japanese Patent Laid-Open No. 2006-108730 does not describe a control method for adopting a plurality of master cameras, and synchronized shutter release by a plurality of master cameras cannot be controlled.

Japanese Patent Laid-Open No. 2011-95473 describes a method for shooting at the same exposure, without the user performing any operation, even if a flash device used as a master flash device is changed over. However, there is no description regarding a method for a case where it is desired to perform control using only a single master device, and a problem is that a slave flash device desired to be controlled becomes the master flash device.

SUMMARY OF THE INVENTION

The present invention has been devised in view of the above-mentioned problems. This disclosure provides, in a system that permits multiple masters, a technique for reducing the possibility that a state contrary to user volition will arise when a slave is changed to a master.

According to one of aspect of the disclosure, there is provided a communication device included in an image sensing system in a network that includes an image sensing device or at least one accessory of an image sensing device, comprising: a setting unit configured to set the communication device to be a master that controls another device within the image sensing system or to be a slave controlled by the master; a decision unit configured to decide whether to permit a plurality of masters to exist within the image sensing network; and a notifying unit configured to transmit a notification to change another master within the image sensing network to a slave; wherein the notifying unit transmits the notification if a plurality of masters have not been permitted to exist within the image sensing network by the decision unit and if the communication device has been changed from a slave to a master by the setting unit; and the notifying unit does not transmit the notification if a plurality of masters have been permitted to exist within the image sensing network by the decision unit and if the communication device has been changed from a slave to a master by the setting unit.

In accordance with the disclosure, it is possible to reduce the possibility that a state contrary to user volition will arise in a system that permits multiple masters.

Further features of the disclosure will become apparent from the following description of exemplary embodiments (with reference to the attached drawings).

DESCRIPTION OF THE EMBODIMENTS

Embodiments according to the present invention will now be described in detail with reference to the accompanying drawings.

First Embodiment

<Hardware Configuration>

Figure 1:
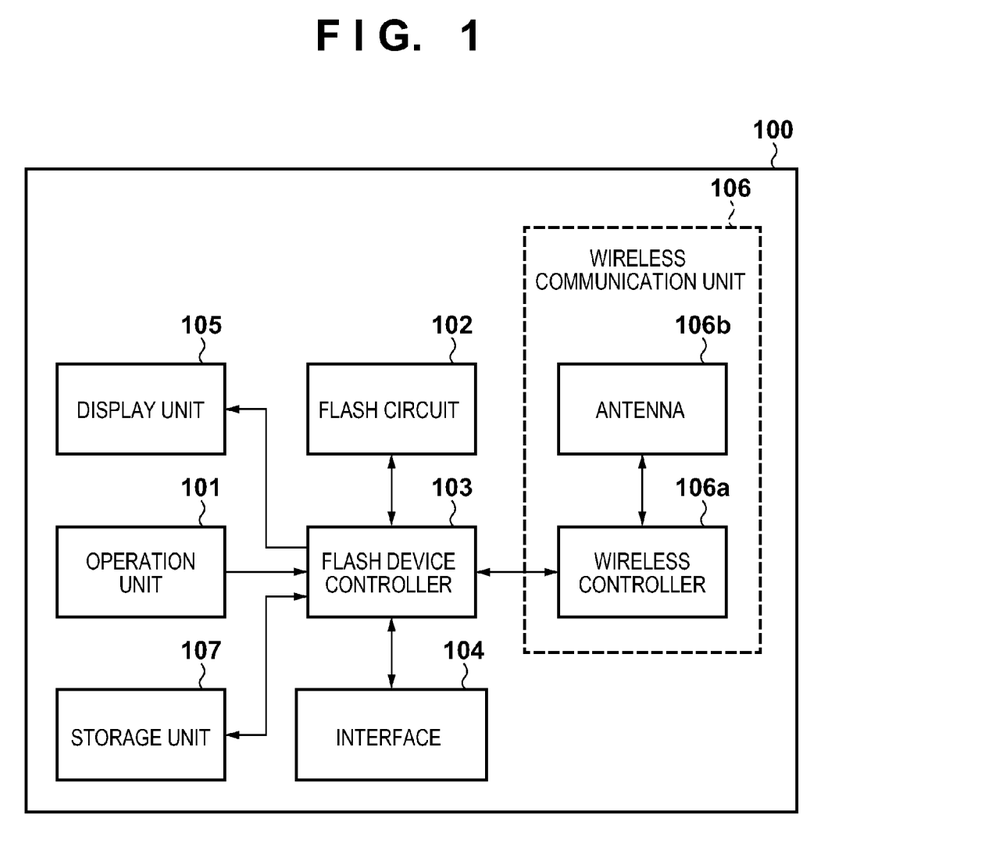
FIG. 1 is a block diagram of a flash device 100.

FIG. 1 is a block diagram illustrating the hardware configuration of a flash device 100 that functions as one accessory of an image sensing device and is capable of being connected to the image sensing device in accordance with the first embodiment. The flash device 100 has an operation unit 101, a flash circuit 102 and a flash device controller 103 for controlling the overall flash device 100. The flash device 100 further includes an interface 104 for communicating with a camera when the flash device is mounted on the camera, a display unit 105 for presenting various displays, and a wireless communication unit 106 for communicating with another device (another flash device). The wireless communication unit 106 is constituted by a wireless communication controller 106a and an antenna 106b. The flash device 100 further includes a storage unit 107 for storing various information.

The flash device controller 103 is connected to the operation unit 101, flash circuit 102, interface 104, display unit 105, wireless communication unit 106 and storage unit 107. It should be noted that all or a portion of the storage unit 107 is constituted by a non-volatile memory so that stored information will not be lost even if power is cut off. This embodiment will be described assuming that the entire storage area of the storage unit 107 is constituted by a non-volatile memory.

The user operates the flash device 100 by manipulating a button, switch, dial or touch panel or the like provided on the operation unit 101. At the time of such operation, the flash device controller 103 receives a control signal from the operation unit 101. In response to receipt of the control signal, the flash device controller 103 controls each of the peripherals from the flash circuit 102 to the storage unit 107. Upon receiving a flash command from the interface 104, operation unit 101 or wireless communication unit 106, the flash device controller 103 instructs the flash circuit 102 to flash. As a result, flash processing is executed in the flash device 100. When the flash device controller 103 and the image sensing device transmit control signals between them, such communication is performed via the interface 104. By operating the operation unit 101 or the image sensing device which is connected via the interface 104, the user can set the number of master devices capable of existing within one network. Further, the user can specify the amount of the flash light emission of the flash device 100 and can set the parameter values of a wireless channel or the like. When these parameter values are changed, the flash device controller 103 instructs the display unit 105 to display the changed parameter values. Further, the flash device controller 103 sends the wireless communication unit 106 a control command for controlling another flash device wirelessly connected to the flash device 100. The wireless communication unit 106 transmits the control command, which it has received from the flash device controller 103, to the other wirelessly connected flash device. The flash device controller 103 then instructs the storage unit 107 to store the changed parameter values. There are two forms of the wireless communication unit 106 that can be mentioned. The first is of the type that is built in the flash device 100, and the second is of the removable type, in which the wireless communication unit 106 is constructed in the form of a card and the flash device 100 is provided with a card slot. Although it does not matter which type is used, this embodiment will be described with regard to the built-in type. The antenna 106b sends and receives wireless communication signals and sends the wireless communication controller 106a the signal received from the communicating party. The wireless communication controller 106a sends the flash device controller 103 data received from the antenna 106b. Conversely, the wireless communication controller 106a transmits data, which has been received from the flash device controller 103, to the communicating party via the antenna 106b.

Figure 2A:
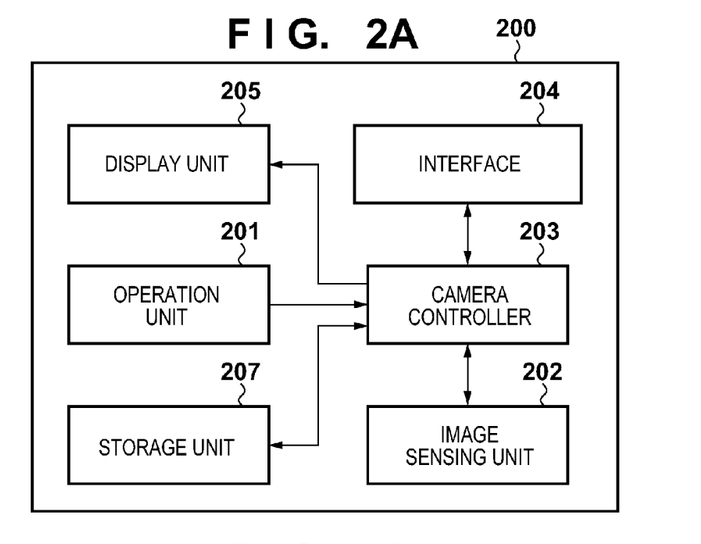
FIGS. 2A and 2B are block diagrams of a camera 200.

FIG. 2A is a block diagram of a camera 200 serving as an image sensing device relating to this embodiment. It should be noted that although a digital camera is taken as an example of a camera in this embodiment, it does not matter if the camera is a film-type camera.

The camera 200 has an operation unit 201, an image sensing unit 202, a camera controller 203, an interface 204, a display unit 205 and a storage unit 207.

The camera controller 203 is connected to the operation unit 201, image sensing unit 202, interface 204, display unit 205 and storage unit 207. The user is capable of setting an image sensing mode for shooting still pictures and movies by operating buttons, switches, dials or a touch panel or the like. At such time the camera controller 203 receives a control signal from the operation unit 201. Upon receiving the control signal, the camera controller 203 controls the peripherals from the image sensing unit 202 to the storage unit 207. When it receives an image sensing command, the camera controller 203 instructs the image sensing unit 202 to perform image sensing. As a result, image sensing processing is executed in the camera 200. When the flash device 100 is mounted on the camera 200, control signals are sent and received between them via the interface 204.

When the camera is connected to the flash device 100, the camera controller 203 communicates with the flash device controller 103, whereby it is capable of discriminating that the wireless communication unit 106 has been mounted on the flash device 100. As a result, it becomes possible to set a synchronized shutter-release function via the intermediary of the wireless network. This setting of the function is performed as a result of the user operating the operation unit 201. Further, if the synchronized shutter-release function has been turned ON, a setting as to whether a single network is allowed to have multiple master devices can also be made by operating the operation units 101 and 201. It should be noted that when the parameter values of the wireless channel or the like are changed, the camera controller 203 instructs the display unit 205 to display the changed parameter values. Further, the camera controller 203 notifies the wireless communication unit 106, via the flash device controller 103, of the number of master devices capable of existing on the network and of the changed wireless channel. The wireless communication unit 106 performs wireless communication using the parameter values received from the camera controller 203. The camera controller 203 then instructs the storage unit 207 to store the changed parameter values.

<System Configuration>

Figure 3A:
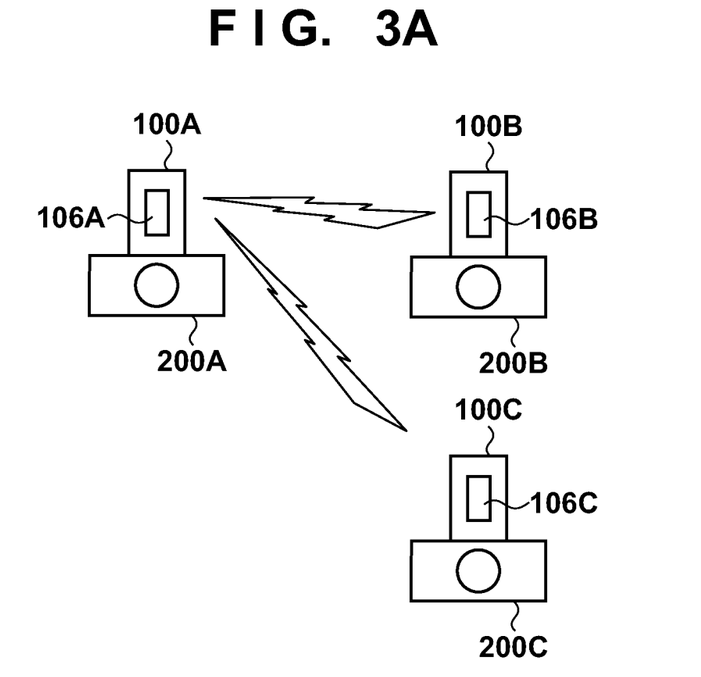
FIGS. 3A and 3B are diagrams each illustrating an example of the configuration of a synchronized shutter-release system.

FIG. 3A illustrates an example in which an image sensing system has been constructed using three flash devices (100A, 100B and 100C). In order to simplify the description, it will be assumed that the flash devices 100A, 100B and 100C each have the structure of FIG. 1 already described and that they are wirelessly connected via wireless communication units 106A, 106B and 106C, respectively. Further, cameras 200A, 200B and 200C will be described on the assumption that they each have the structure illustrated in FIG. 2A.

The concept of master and slave in this embodiment will now be described. A master referred to in this embodiment is a device on the side that controls a slave by transmitting signals such as an image sensing command to the slave. A slave is a device on the controlled side, which executes processing upon receiving a control signal from a master. According to this concept, a camera that has been set to perform the role of the controlling side shall be referred to as a master (or a flash device that has been mounted on this camera shall be referred to as a master flash device), and a camera the role of which is to be controlled shall be referred to as a slave (or a flash device that has been mounted on this camera shall be referred to as a slave flash device).

Whether operation is to be as a master or slave is set directly by displaying a menu on a user interface, which is formed by the display unit 105 and operation unit 101 of the respective flash device, and then making a selection from the menu. Alternatively, an arrangement may be adopted in which a menu is displayed on a user interface formed by the display unit 205 and operation unit 201 of the camera on which the flash device has been mounted, and the user makes the setting indirectly from the menu. In the case of the latter, the camera controller 203, via the interface 204, notifies the flash device controller 103 of either the master or slave setting regarding the flash device connected to its own camera, thereby implementing the master or slave setting.

Figure 3B:
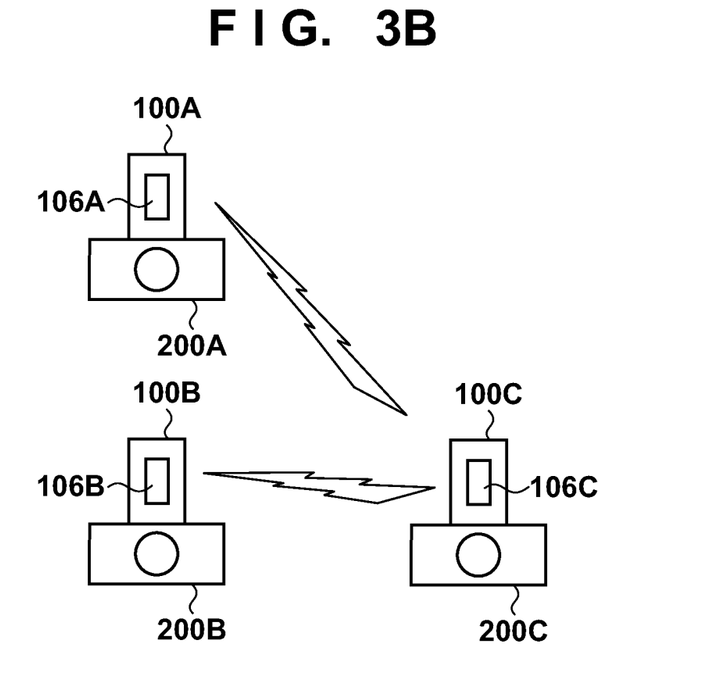

Further, in the system according to this embodiment, multiple masters are permitted. The term "multiple masters" refers to a configuration in which a single system contains a plurality of masters. FIG. 3B illustrates an example of a system constructed by multiple masters. FIG. 3B represents a multiple-master system in which flash devices 100A and 100B are master flash devices and flash device 100C is a slave flash device. The hardware configuration is the same as that of the flash devices 100A, 100B, 100C in FIG. 3A. The only difference here is that the slave flash device 100B is now a master flash device.

Figure 7:
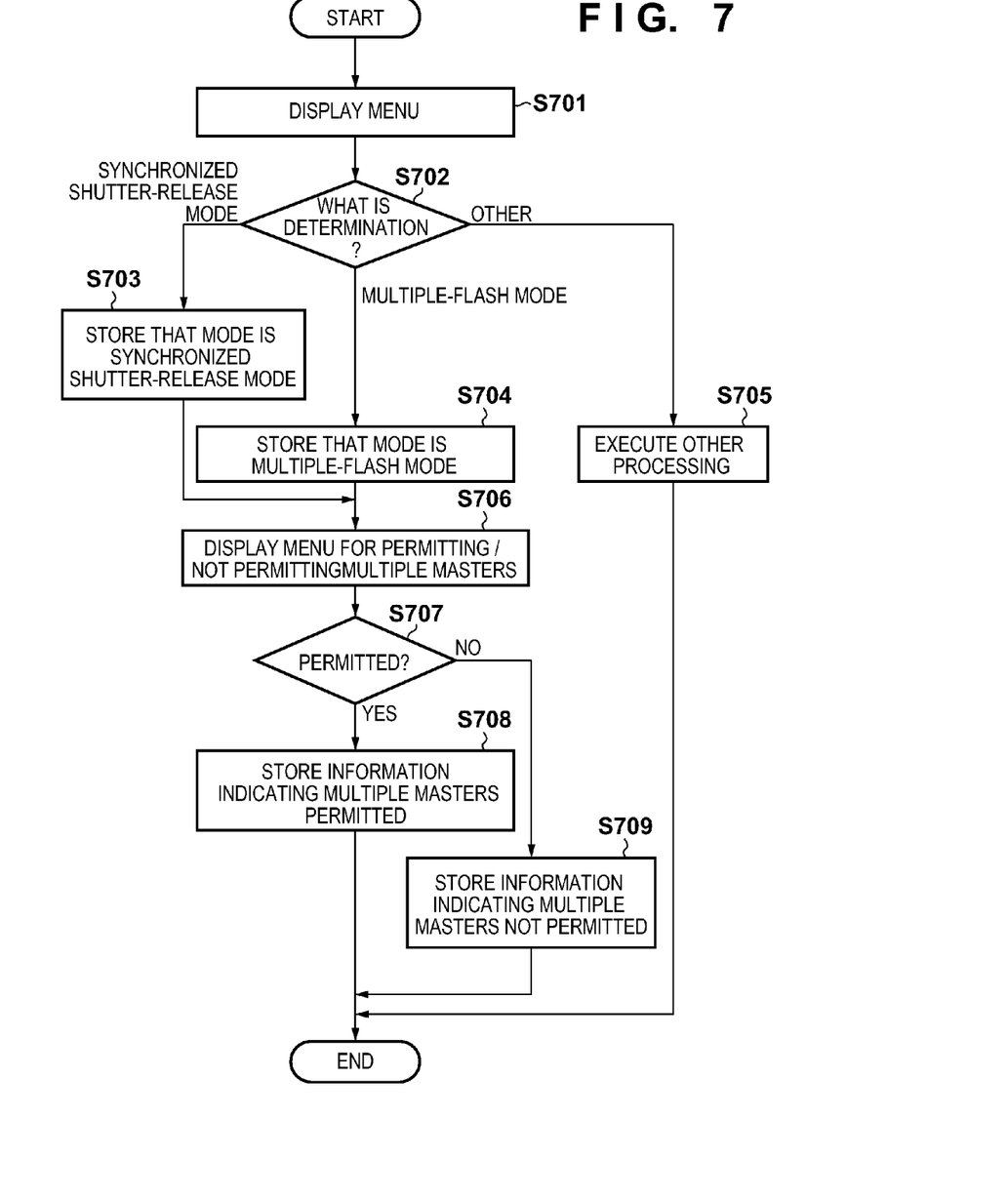
FIG. 7 is a flowchart illustrating processing relating to setting processing executed in a flash device controller.

The details of processing regarding a master/slave setting and executed by the flash device controller 103 will be described in accordance with the flowchart of FIG. 7. The processing shown in FIG. 7 is executed when a predetermined button or switch provided on the operation unit 101 is operated.

At step S701, first the flash device controller 103 causes the display unit 105 to display an operating-mode selection menu and waits for a selection instruction from the user. Then, at step S702, the flash device controller 103 determines whether the selection instruction is one that sets the device as a member within an image sensing system relating to synchronized shutter release, one that sets the device as a member within an image sensing system relating to the multiple-flash mode, or some other setting. Control proceeds to processing (any one of steps S703, S704, S705) depending upon the result of the determination. The multiple-flash mode will be described in a second embodiment below. Here the description will deal with a case where the device has been set as a member that operates in the synchronized shutter-release mode. It should be noted that the synchronized shutter-release mode is one example of an image-sensing control mode and that the multiple-flash mode is one example of a flash control mode.

If the setting for operation in the synchronized shutter-release mode is selected, the flash device controller 103 stores information, which indicates that the mode is the synchronized shutter-release mode, in the storage unit 107 at step S703. Then, at step S706, the flash device controller 103 causes the display unit 105 to display a menu for selecting whether or not to permit multiple masters. Next, at step S707, the flash device controller 103 determines which selection the user has made. If the user has selected to permit multiple masters, the flash device controller 103 causes the storage unit 107 to store information indicating that multiple masters are permitted (step S708) and then terminates processing. If the user has selected not to permit multiple masters, on the other hand, then the flash device controller 103 causes the storage unit 107 to store information indicating that multiple masters are not permitted (step S709) and then terminates processing.

Thus the user operates each of the flash devices 100A, 100B and 100C to thereby perform the above-mentioned processing.

The example of FIG. 3A illustrates an example in which the flash device 100A has been set as a master flash device and the flash devices 100B and 100C have been set as slave flash devices.

<Synchronized Shutter Release>

Described next is an overview of operation when synchronized shutter release implemented by the system of this embodiment has been set. It will be assumed that the setting of synchronized shutter release is carried out by the operation units of each of the cameras 200A, 200B and 200C or by the operation units of the flash devices mounted on these cameras.

The synchronized shutter-release function refers to a function in which, in accordance with an image sensing operation carried out by the camera 200A, the cameras 200B and 200C also an image sensing operation in synchronized fashion. Since no camera described in this embodiment has a wireless communication function, the wireless communication units 106 of respective ones of the flash devices 100A, 100B and 100C mounted on the respective cameras are utilized in order to implement synchronized shutter release. It should be noted that it is also possible for the system of this embodiment to perform synchronized shutter release in the multiple-master state described above. If multiple masters are used, it is possible to broaden the scope of remote shooting. On the other hand, however, there is the possibility that management of master and slave flash devices will be more complicated.

Figure 5:
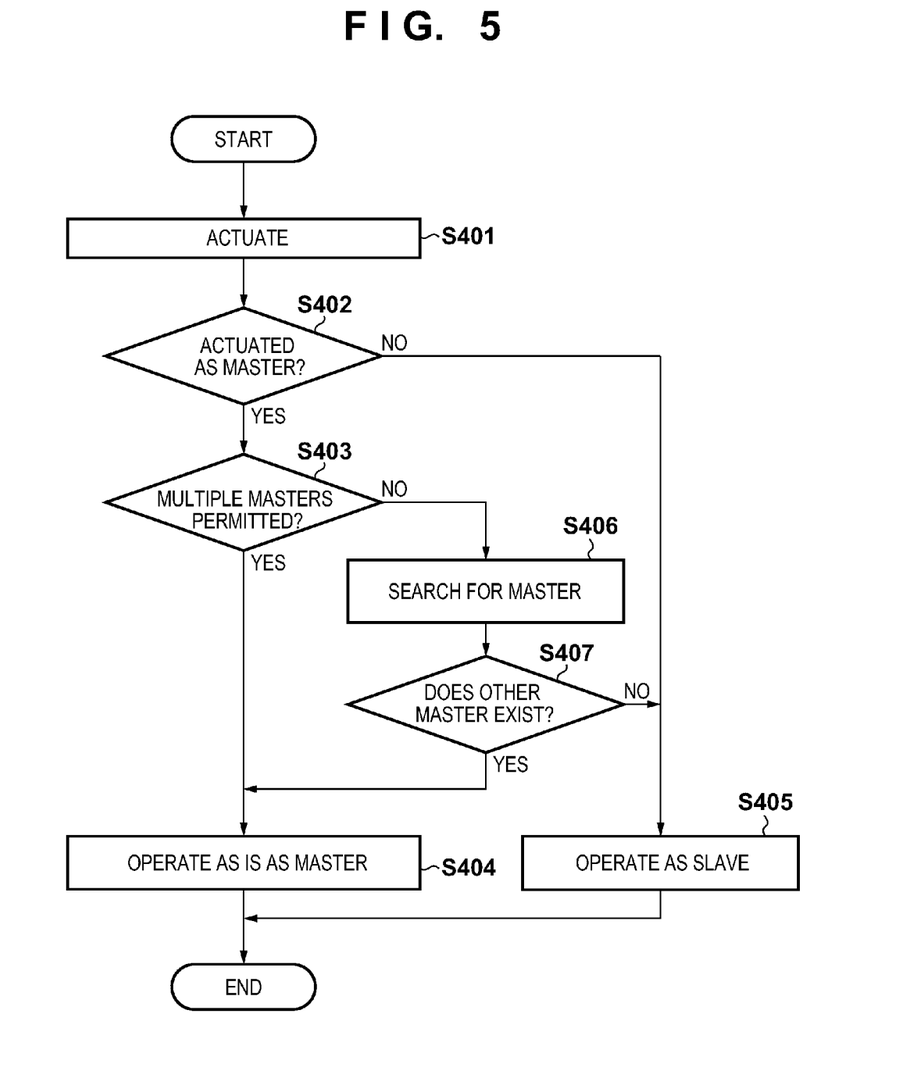
FIG. 5 is a flowchart illustrating processing executed when a flash device controller is actuated.

Processing for deciding master and slaves will be described. FIG. 5 is a flowchart of processing executed when the flash device 100A is actuated. In the description that follows, it will be assumed that the configuration of the flash device 100A is that shown in FIG. 2A. It will be assumed that the same holds for the other flash devices 100B and 100C and, hence, a description of these devices is omitted.

The flash device controller 103 is actuated (step S401) by turning the power source off and then turning it on again by the operation unit 101 of the flash device 100A or by recovery from a sleep mode that is for reducing the power consumption of the flash device controller 103. At this time the flash device controller 103 reads out, from the storage unit 107, its own operating mode and ascertains whether the device is a master or slave (step S402). If the device has been actuated as a master, the flash device controller 103 reads out and checks the multiple-master permit or prohibit mode from the storage unit 107 (step S403). If the device has been actuated as a slave, then the flash device controller 103 controls the flash device 100 as a slave flash device (step S405). If multiple masters are permitted at step S403, the flash device controller 103 controls the flash device 100 as a master flash device (step S404). If multiple masters are prohibited, on the other hand, the flash device controller 103 commands the wireless communication unit 106 to search for a master flash device in order to ascertain whether another master flash device exists. Upon receiving this command, the wireless communication unit 106 conducts a search for a master flash device by broadcast (step S406). The wireless communication unit 106 determines whether or not there is a response to the search for the master flash device (step S407). If there is no response, the wireless communication unit 106 notifies the flash device controller 103 that no master flash device other than its own exists, and the flash device controller 103 controls the flash device 100 as a master flash device. In other words, if the mode for prohibiting multiple masters has been set, the flash device can change itself to a master on the condition that no masters other than itself exist. If a response is received, on the other hand, then the wireless communication unit 106 notifies the flash device controller 103 that a master flash device other than its own exists, control proceeds to step S405 and the flash device controller 103 controls the flash device 100 as a slave flash device.

A synchronized shutter-release operation becomes possible after master and slave flash devices are decided as described above. The content of processing by a flash device when the synchronized shutter-release mode is in effect will be described below in detail.

The flash devices 100A, 100B and 100C have the configuration shown in FIG. 1. However, in order to distinguish among the mutual constituent components, the description will be rendered upon appending the characters "A", "B" and "C" to the reference characters of the arrangement of FIG. 1 for the sake of convenience. The cameras 200A, 200B and 200C also have the configuration shown in FIG. 2A and the description will be rendered upon appending the characters "A", "B" and "C".

An image sensing operation is performed by the operation unit 201A of camera 200A and, in response, the camera controller 203A transmits an image sensing command to two units, namely to the image sensing unit 202A and to the flash device controller 103A via the interfaces 204A and 104A. Upon receiving the command, the image sensing unit 202A executes image sensing processing. The camera controller 203A performs compressive encoding and stores the result in the storage unit 207A as a file. Meanwhile, the flash device controller 103A reads out the control content of the slave flash device from the storage unit 107A, determines that the content is indicative of synchronized shutter release and transmits the image sensing command to the wireless communication unit 106A. This is one example of processing executed by image sensing command transmitting means. The wireless communication unit 106A transmits a packet for the image sensing command from the wireless communication controller 106aA to the antenna 106bA, and the antenna 106bA transmits the image sensing command packet to the antennas 106bB and 106bC. The antennas 106bB and 106bC of the flash devices 100B and 100C that have received the image sensing command packet transmit the image sensing command to the flash device controllers 103B and 103C via the wireless communication units 106aB and 106aC. The flash device controllers 103B and 103C transmit the image sensing command to the camera controllers 203B and 203C via the interfaces 104B and 204B and interfaces 104C and 204C. The camera controllers 203B and 203C transmit the image sensing command to the image sensing units 202B and 203C. The camera controllers 203B and 203C compressively encode the images obtained by image sensing and store the results in the storage units 207B and 207C as files.

Figure 8A:
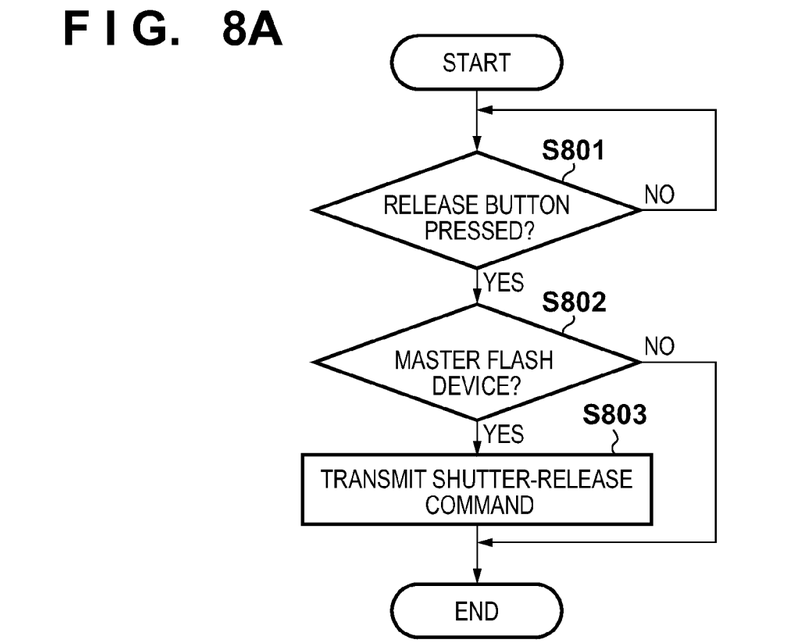
FIGS. 8A and 8B are flowcharts illustrating processing in a first embodiment.

Synchronized shutter-release processing will be described below with reference to the flowcharts of FIGS. 8A and 8B. FIG. 8A is a flowchart on the side that transmits a shutter-release command in synchronized shutter release. The description will be rendered taking the system configuration of FIG. 3A as an example.

First, whether an image sensing operation has been performed is sensed by the operation unit 201A (step S801). Here the operation unit 201A is one example of means for receiving an image sensing instruction. In response, the camera controller 203A transmits the image sensing command to two units, namely to the image sensing unit 202A and to the flash device controller 103A via the interfaces 204A and 104A. The image sensing unit 202A executes image sensing processing and image sensing is performed by the camera 200A. Meanwhile, the flash device controller 103A reads out from the storage unit 107A whether its own device is a master flash device (step S802). If the device is a master flash device, then the flash device controller 103A reads out from the storage unit 107A the fact that the control content of the slave flash devices has been set to synchronized shutter release and transmits the image sensing command to the wireless communication unit 106A. The wireless communication unit 106A transmits a packet for the image sensing command from the wireless communication unit 106aA to the antenna 106bA, and the antenna 106bA transmits the image sensing command packet to the antennas 106bB and 106bC (step 803).

It should be noted that in a case where the flash device 100B also is a master flash device, as in FIG. 3B, and the plurality of masters are in the synchronized shutter-release mode, the flash device 100B operates in the same manner as the flash device 100A and controls the shutter release of the flash device 100C.

Figure 8B:
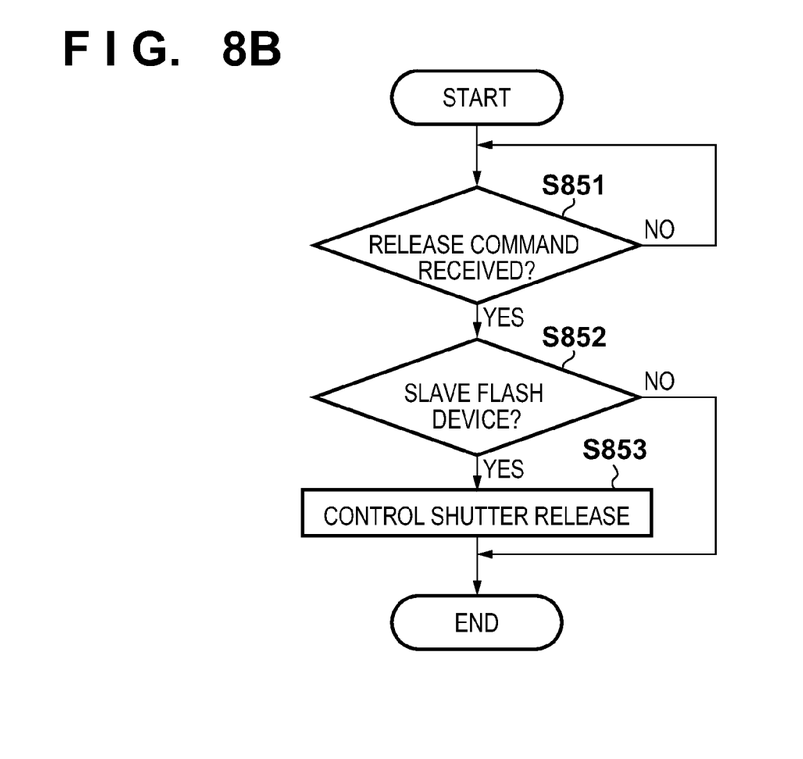

FIG. 8B is a flowchart on the side that receives the shutter-release command in synchronized shutter release. Since the description will be rendered taking the system configuration of FIG. 3A as an example, the description that follows will be that of the operation of the cameras 200B and 200C.

First, receipt of the image sensing command packet is sensed (step S851). At this time the antennas 106bB and 106bC transmit the image sensing command to the flash device controllers 103B and 103C via the wireless communication units 106aB and 106aC. The flash device controllers 103B and 103C then read out from the storage units 107B and 107C whether their own devices have been set as slave flash devices (step S852). If the devices are slave flash devices, then the flash device controllers 103B and 103C transmit the image sensing command to camera controllers 203B and 203C via the interfaces 104B and 204B and the interfaces 104C and 204C. The camera controllers 203B and 203C transmit the image sensing command to the image sensing units 202B and 202C. The image sensing units 202B and 202C execute image sensing processing and image sensing is performed by the cameras 200B and 200C (step S853). The foregoing relates to the arrangement of FIG. 3A. In a case where the flash device 100B also is a master flash device, as in FIG. 3B, and the plurality of masters are in the synchronized shutter-release mode, the master flash devices that have received the shutter-release command do not carry out shutter-release control owing to the decision rendered at step S852. The above-described operation is an overview of synchronized shutter release.

<Master/Slave Changeover>

Figure 4:
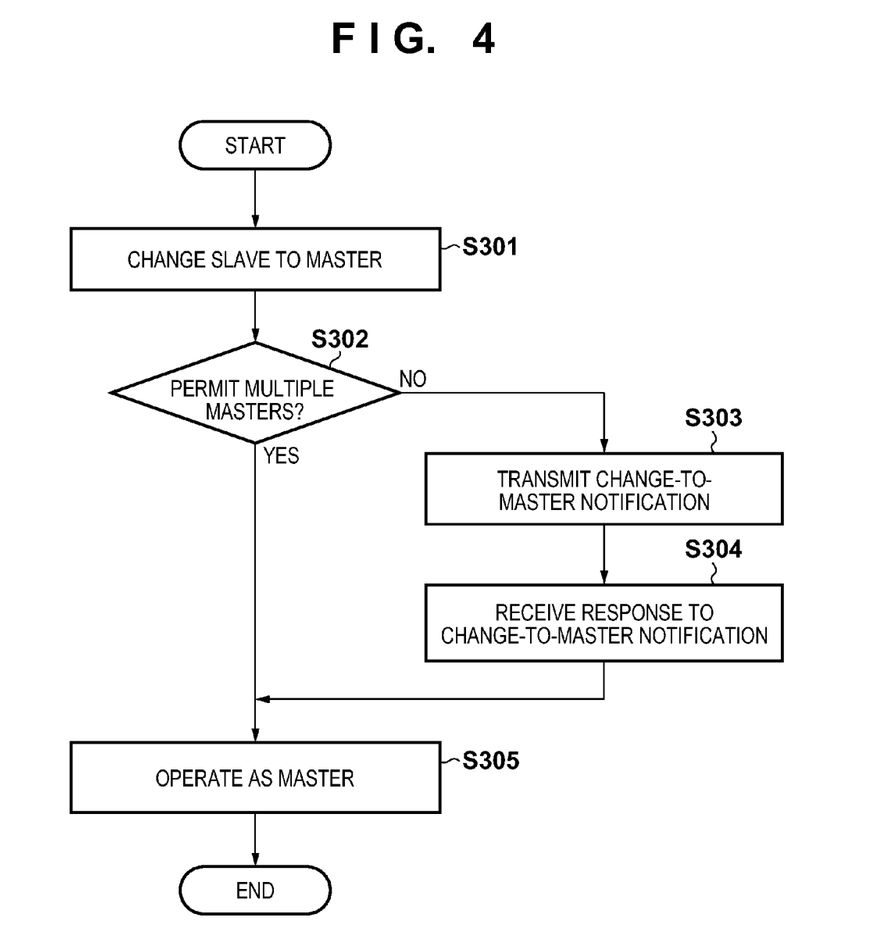
FIG. 4 is a flowchart illustrating processing for changing a slave to a master executed in a flash device controller.

FIG. 4 is a flowchart illustrating the details of processing executed by the flash device controller 103B or 103C when the slave flash device 100B or 100C is set to operate as a master flash device. In order to simplify the description, processing will be described for a case where the user has set the slave flash device 100B as a master flash device in synchronized shutter release by operating the operation unit 101B.

When the slave flash device 100B is set as a master flash device by using the operation unit 101B, the flash device controller 103B notifies the wireless communication unit 106B that the slave flash device is to be changed to a master flash device (step S301). In response, the wireless communication unit 106B reads out from the storage unit 107B and ascertains whether the mode is that which permits or prohibits multiple-master operation, which is an operation for controlling a slave by multiple master flash devices. The multiple-master permit or prohibit mode is input from the operation unit 101B and is stored in the storage unit 107B via the flash device controller 103B. In a case where multiple masters have been permitted, the flash device controller 103B controls the flash device 100B as a master flash device.

If on the other hand it is determined at step S302 that the flash device controller 103B has prohibited multiple masters, the wireless communication unit 106B transmits to the entire network the fact that the slave flash device 100B is to be changed to a master flash device (step S303). The wireless communication unit 106B then receives (step S304) from the wireless communication unit 106A of the master flash device 100A a response signal indicating acceptance of the notification of the change to the master flash device, and the flash device 100B operates as a master flash device. It should be noted that the flash device controller 103A within the master flash device 100A that had been functioning as a master flash device until now changes in such a manner that its own device now functions as a slave flash device.

In accordance with this embodiment, as described above, it is possible for a master flash device to be changed or for a plurality thereof to be made to coexist, in the following two cases, in accordance with whether multiple master devices are permitted or prohibited: The first is when the slave flash device 100B or 100C has been changed to a master flash device. The second is when power has been turned off and then turned on again by the operation units 101A, 101B, 101C or when there is recovery from the sleep mode. In the description of this embodiment, the description relates to three sets of flash devices and cameras, namely the flash devices 100A, 100B, 100C and cameras 200A, 200B, 200C. However, the effects of this embodiment can be attained even in case of two sets or four or more sets.

It should be noted that when a case where the flash device controller 103A of the flash device 100A executes the processing of FIG. 5 is assumed, the flash device controller 103A controls the flash device 100A as a slave if a master flash device is found to exist at step S407. However, it is also possible to transmit a change-to-master notification using the wireless communication unit 106A, thereby causing a master flash device that has been operating from the past to change to a slave flash device, and have the flash device controller 103A control the flash device 100A as a master flash device.

Modification of the First Embodiment

Figure 2B:
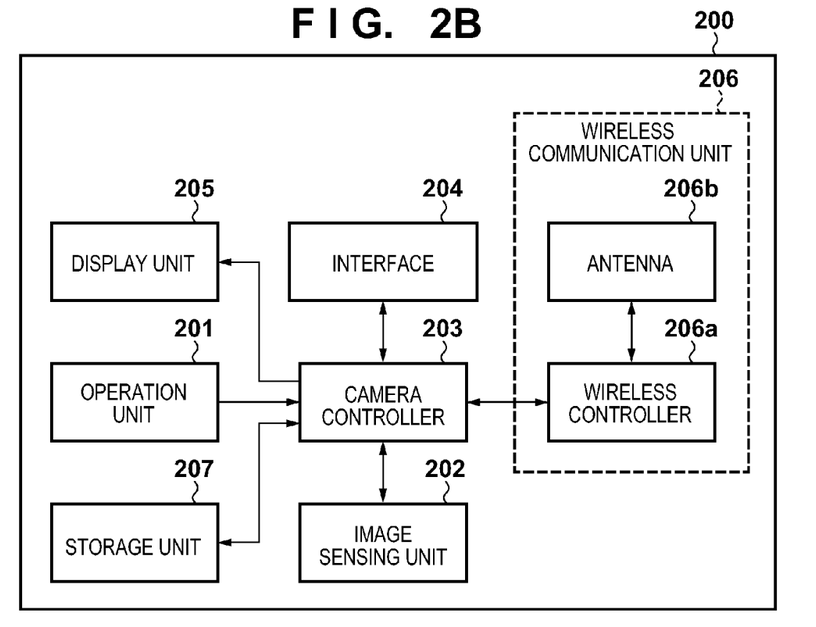

In first embodiment set forth above, synchronized release has been described with regard to an example in which use is made of the wireless communication unit within the flash device connected to each camera. However, in a case where a camera itself has a wireless communication unit 206 that includes a wireless communication controller 206a and an antenna 206b, as shown in FIG. 2B, this camera can execute synchronized shutter-release processing with the intermediary of a flash device. It should be noted that in an arrangement in which a camera is equipped with a wireless communication unit, there is a configuration in which the wireless communication unit is built in the camera and a configuration in which the camera is provided with a card slot and a wireless communication card is inserted into the slot to thereby connect the card to the camera. In either case, it will suffice if the camera controller 203 functions as the "flash device controller 103" in the foregoing first embodiment and therefore a description of these configurations is unnecessary.

It is assumed that in a case where a flash device having a communication unit has been connected to a camera having a communication unit, which of these communication units is utilized will be set by the operation units 101 and 201.

Second Embodiment

Figure 6A:
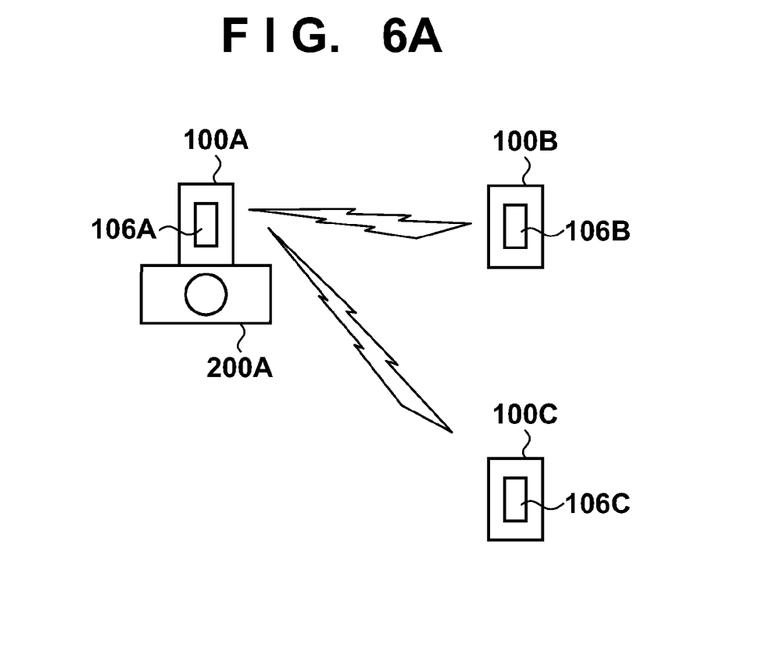
FIGS. 6A and 6B are diagrams illustrating examples of configurations of multiple-flash device systems according to a second embodiment.

FIG. 6A illustrates an example of the system configuration according to a second embodiment of the present invention. As illustrated in FIG. 6A, three flash devices 100A, 100B and 100C are used, one of these, namely the flash device 100A, is mounted on the camera 200A, and the other flash devices 100B and 100C function independently. In the second embodiment, this arrangement constitutes a multiple-flash system.

In order to simply the description, it will be assumed that the flash devices 100A, 100B and 100C have the configuration shown in FIG. 1 and that the camera 200A has the configuration shown in FIG. 2A. It will be assumed that the flash devices 100A, 100B and 100C have already established wireless communication, that the flash device 100A has been set as a master flash device in the multiple-flash mode, and that the flash devices 100B and 100C have been set as slave flash devices. Furthermore, it will be assumed that the camera 200A and master flash device 100A have been connected by the interfaces 204A and 104A.

Figure 6B:
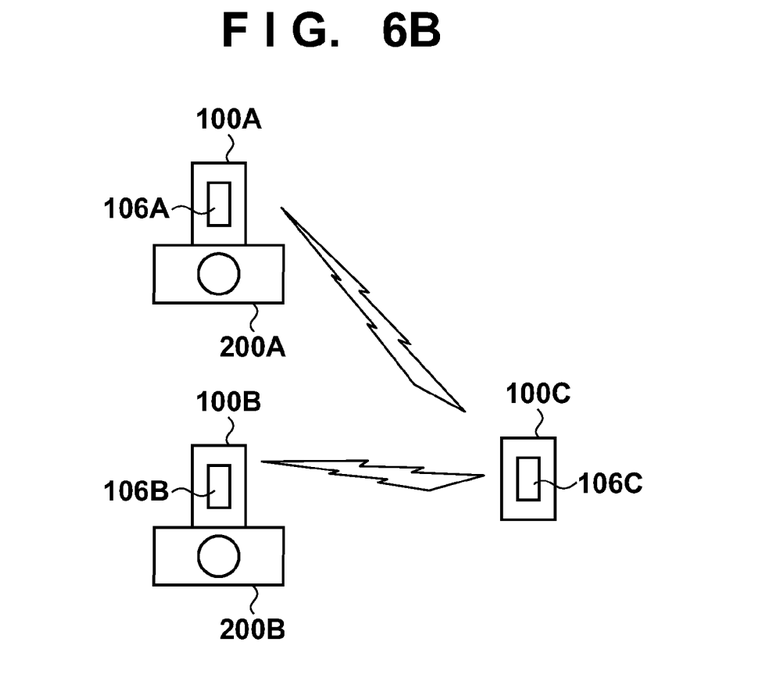

Further, it is also possible for the system according to this embodiment to employ multiple masters in a manner similar to that of the first embodiment. In the example of FIG. 6B, it is assumed that the flash devices 100A and 100B have been set as master flash devices and that the flash device 100C has been set at a slave flash device.

In the second embodiment as well, the embodiment is described with the suffixes "A", "B" and "C" appended for the sake of convenience in order to distinguish among the components within the flash devices 100A, 100B and 100C.

<Multiple-Flash (Light-Emission) Control>

Described below is an overview of control of the slave flash devices 100B and 100C according to the second embodiment. In the second embodiment, the slave flash devices 100B and 100C control light emission (referred to as "flash control" below) in accordance with image sensing processing by the camera 200A connected to the master flash device 100A via the interfaces 104A and 204A. It should be noted that it is possible to make a setting for permitting or prohibiting multiple masters, in a manner similar to that of synchronized shutter release, even in such flash control. Since the method of setting master and slave flash devices is similar to that used in synchronized shutter release, this need not be described here. The details of flash control in the second embodiment will now be described.

Upon detecting that an image sensing operation has been performed by the operation unit 201A, the camera controller 203A transmits an image sensing command to two units, namely to the image sensing unit 202A and to the flash device controller 103A via the interfaces 204A and 104A. The image sensing unit 202A executes image sensing processing and image sensing by the camera 200A is carried out. Upon receiving the image sensing command, the flash device controller 103A reads out from the storage unit 107A the fact that the present mode is that of the master that is to apply flash control, or in other words, that flash control of the slave flash devices is to be carried out, and then transmits a flash command to the wireless communication unit 106A. If a flash from the master flash device 100A has been enabled, then it transmits the flash command to the flash circuit 102A at this time. The flash circuit 102A executes flash processing and a flash is produced by the flash device 100A. The wireless communication unit 106A transmits a packet for the flash command from the wireless communication unit 106aA to the antenna 106bA, and the antenna 106bA transmits the flash command packet to the antennas 106bB and 106bC. This is one example of processing by flash command transmitting means. The antennas 106bB and 106bC that have received the flash command packet transmit the flash command to the flash device controllers 103B and 103C via the wireless communication units 106aB and 106aC. Upon receiving the flash command, the flash device controllers 103B and 103C read out from the storage units 107B and 107C information indicative of a slave under flash control and, in response, transmit the flash command to the flash circuits 102B and 102C. The flash circuits 102B and 102C execute flash processing and a flash is emitted from each of the flash devices 100B and 100C.

Figure 9A:
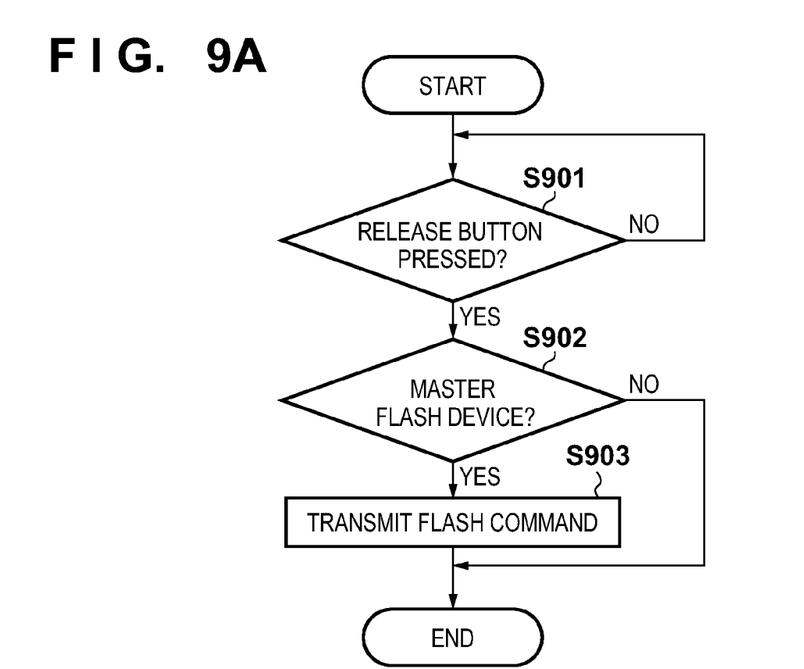
FIGS. 9A and 9B are flowcharts illustrating processing in a second embodiment.

Multiple-flash control processing will be described below with reference to the flowcharts of FIGS. 9A and 9B. FIG. 9A is a flowchart on the side that transmits a flash command in multiple-flash control processing. The description will be rendered taking the system configuration of FIG. 6A as an example.

First, whether an image sensing operation has been performed is sensed by the operation unit 201A (step S901). In response, the camera controller 203A transmits the flash command to two units, namely to the image sensing unit 202A and to the flash device controller 103A via the interfaces 204A and 104A. The image sensing unit 202A executes image sensing processing and image sensing is performed by the camera 200A.

Meanwhile, the flash device controller 103A reads out from the storage unit 107A the setting indicating whether its own device is a master flash device (step S902). If the device is a master flash device, then the flash device controller 103A reads out from the storage unit 107A the setting indicating the fact that the control content of the slave flash devices is flash control and transmits the flash command to the wireless communication unit 106A. The wireless communication unit 106A transmits a packet for the flash command from the wireless communication unit 106aA to the antenna 106bA, and the antenna 106bA transmits the flash command packet to the antennas 106bB and 106bC (step 903).

The foregoing is a case where the configuration of FIG. 6A is taken as an example. However, in a case where the flash device 100B also is a master flash device, as in FIG. 6B, and the plurality of masters are operating in flash control, the flash device 100B operates in the same manner as the flash device 100A and controls the flash of the flash device 100C.

Figure 9B:
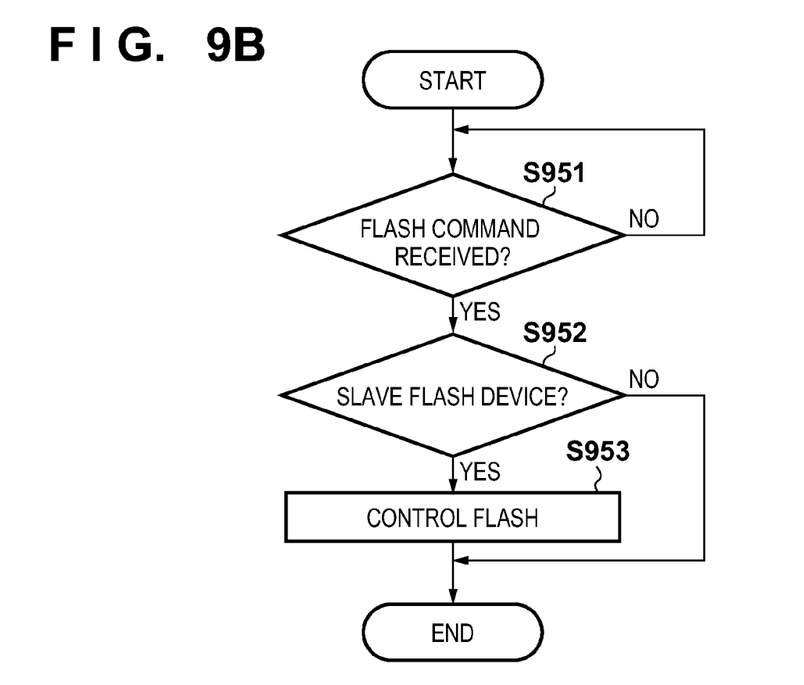

FIG. 9B is a flowchart on the side that receives the flash command in multiple-flash control processing.

First, receipt of the flash command packet is sensed (step S951). At this time the antennas 106bB and 106bC transmit the flash command to the flash device controllers 103B and 103C via the wireless communication units 106aB and 106aC. The flash device controllers 103B and 103C then read out from the storage units 107B and 107C whether their own devices have been set as slave flash devices (step S952). If the devices are slave flash devices, then the flash device controllers 103B and 103C transmit the flash command to the flash circuits 102B and 102C. The flash circuits 102B and 102C execute flash processing and a flash is emitted by each of the flash devices 100B and 100C (step S953). The foregoing relates to the arrangement of FIG. 6A. In a case where the flash device 100B also is a master flash device, as in FIG. 6B, and the plurality of masters are operating in flash control, the master flash devices that have received the flash command do not carry out flash control owing to the decision rendered at step S952. The above-described operation is an overview of flash control.

In accordance with the second embodiment, it is possible for a master flash device to be changed or for a plurality thereof to be made to coexist, in the following two cases, in accordance with whether multiple master devices are permitted or prohibited: The first is when the slave flash device 100B or 100C has been changed to a master flash device. The second is when power has been turned off and then turned on again by the operation units 101A, 101B, 101C or when there is recovery from the sleep mode.

Accordingly, in accordance with the second embodiment, when, at such time that the slave flash devices 100B and 100C have been changed to flash-control (multiple-flash system) master flash devices, the power sources are turned off and then turned on again by the operation units 101A, 101B, 101C or recovery from the sleep mode has occurred, it becomes possible for the flash device controllers 103A, 103B and 103C to change the masters that perform flash control, or to allow a plurality of the masters to coexist, in accordance with whether multiple masters are permitted or prohibited. In the description of the second embodiment, the description relates to three sets of flash devices (100A, 100B, 100C). However, the effects of the second embodiment can be attained even in case of two sets or four or more sets.

It should be noted that if a master flash device is found to exist at step S407 in the second embodiment as well, the flash device controllers 103A to 103C control the flash devices 100A to 100C as slaves. However, it is also possible to transmit a change-to-master notification using the wireless communication units 106A to 106C, thereby causing a master flash device that has been operating from the past to change to a slave flash device.

Further, although the wireless communication units 106A, 106B and 106C are used in the second embodiment, the effects of the second embodiment can be attained even if the wireless communication units 206A, 206B and 206c of the cameras 200A, 200B and 200C are used instead.

Third Embodiment

Systems have been described having a synchronized shutter-release mode in the first embodiment and a multiple-flash mode in the second embodiment. In this embodiment, a system having both modes will be described.

The flash devices 100A, 100B and 100C in this embodiment are capable of selecting, as by the user making a choice from a menu, whether operation is to be performed in the synchronized shutter-release mode or in the multiple-flash mode. In a case where the synchronized shutter-release mode or multiple-flash mode has been selected, the flash devices 100A, 100B and 100C change the multiple-master permit or prohibit setting based upon the set mode and store the setting in the storage units 107A, 107B and 107C. In this embodiment, multiple masters are permitted in the multiple-flash mode and are prohibited in the synchronized shutter-release mode. In other words, in this embodiment, the setting as to whether the mode is the multiple-flash mode or the synchronized shutter-release mode corresponds to a setting as to whether or not multiple masters are permitted. If FIG. 7 is applied to this embodiment, control proceeds to step S709 without traversing step S706 in a case where the synchronized shutter-release mode has been selected at step S702. Further, control proceeds to step S708 without traversing step S706 in a case where the multiple-flash mode has been set at step S702.

Other Embodiments

In the foregoing embodiments, examples in which the flash devices have a wireless communication unit have been described. However, it does not matter if the wireless communication unit is of the kind that can be removably inserted into the flash device. In such case, an example in which the flash device has a wireless communication controller and an example in which a separate wireless communication unit has the wireless communication controller are conceivable and either arrangement may be adopted.

In the foregoing embodiments, examples are described in which the cameras and flash devices are separate units. However, it does not matter if the arrangement is such that the flash devices are built in the cameras. In such case the control of the flash circuit or wireless communication unit is performed entirely by the camera controller. Accordingly, the flash device controller in the first and second embodiments may be substituted for the camera controller.

In accordance with the embodiments as described above, a camera or flash device has a mode for permitting or prohibiting multiple masters. Further, it is possible to change a slave to a master in accordance with the set mode. Furthermore, if multiple masters have been prohibited, a device that has already been set as a master is changed to a slave automatically. This means that the possibility that a system configuration that is contrary to the volition of the user will arise can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-023508, filed Feb. 6, 2012, which is hereby incorporated by reference herein in its entirety.

What is claimed is:

1. A communication device included in an image sensing system in a network that includes an image sensing device or at least one accessory of an image sensing device, comprising:
   a setting unit configured to set the communication device to be a master that controls another device within the image sensing system or to be a slave controlled by the master;
   a decision unit configured to decide whether to permit a plurality of masters to exist within the image sensing system; and
   a notifying unit configured to transmit a notification to change another master within the image sensing system to a slave;
   wherein said notifying unit transmits the notification, if a plurality of masters have not been permitted to exist within the image sensing system by said decision unit and if the communication device has been changed from a slave to a master by said setting unit; and
   said notifying unit does not transmit the notification, if a plurality of masters have been permitted to exist within the image sensing system by said decision unit and if the communication device has been changed from a slave to a master by said setting unit.

2. The communication device according to claim 1, wherein the image sensing system includes an image sensing device; and
   the communication device has an image sensing control mode in which another image sensing device that has been set to be a slave is made to perform image sensing in a case where the communication device has been set to be a master by said setting unit.

3. The communication device according to claim 1, wherein the image sensing system includes a flash device; and
   the communication device has a flash control mode in which another flash device that has been set to be a slave is made to flash in a case where the communication device has been set to be a master by said setting unit.

4. The communication device according to claim 1, further having:
   an image sensing control mode in which another image sensing device included in the image sensing system and set to be a slave is made to perform image sensing in a case where the communication device has been set to be a master by said setting unit; and
   a flash control mode in which another flash device included in the image sensing system and set to be a slave is made to flash in a case where the communication device has been set to be a master by said setting unit;
   wherein in a case where the communication device is in the image sensing control mode, said decision unit does not permit a plurality of masters to exist within the image sensing system; and
   in a case where the communication device is in the flash control mode, said decision unit permits a plurality of masters to exist within the image sensing system.

5. The communication device according to claim 2, further comprising:
   a reception unit configured to receive an image sensing instruction; and
   an image sensing command transmitting unit configured to transmit an image sensing command to the other image sensing device, which has been set to be a slave, if the image sensing instruction has been received in the image sensing control mode and if the communication device has been set to be a master by said setting unit.

6. The communication device according to claim 3, further comprising:
   a reception unit configured to receive an image sensing instruction; and
   a flash command transmitting unit configured to transmit a flash command to the other flash device, which has been set to be a slave, if the image sensing instruction has been received in the flash control mode and if the communication device has been set to be a master by said setting unit.

7. The communication device according to claim 1, wherein said decision unit makes the decision based upon a user operation.

8. The communication device according to claim 1, wherein said setting unit makes the setting based upon a user operation.

9. The communication device according to claim 1, wherein the communication device is at least one of an image sensing device, a flash device and a wireless communication unit removably mounted on a flash device.

10. A method of controlling a communication device included in an image sensing system in a network that includes an image sensing device or at least one accessory of an image sensing device, comprising:
   a setting step of setting the communication device to be a master that controls another device within the image sensing system or to be a slave controlled by the master;
   a decision step of deciding whether to permit a plurality of masters to exist within the image sensing system; and
   a notifying step of transmitting a notification to change another master within the image sensing system to a slave;
   wherein said notifying step transmits the notification, if a plurality of masters have not been permitted to exist within the image sensing system at said decision step and if the communication device has been changed from a slave to a master at said setting step; and
   said notifying step does not transmit the notification, if a plurality of masters have been permitted to exist within the image sensing system at said decision step and if the communication device has been changed from a slave to a master at said setting step.

* * * * *